United States Patent
Bobe et al.

(10) Patent No.: US 11,478,004 B2
(45) Date of Patent: *Oct. 25, 2022

(54) PROCESS FOR MAKING A BOUILLON TABLET OR BOUILLON CUBE

(71) Applicant: SOCIETE DES PRODUITS NESTLE S.A., Vevey (CH)

(72) Inventors: Ulrich Bobe, Hilzingen (DE); Annabel Bozon, Sheffield (GB); Volker Kehlenbeck, Bodman-Ludwigshafen (DE); Jimmy Perdana, Singen (DE)

(73) Assignee: Societe des Produits Nestle S.A., Vevey (CH)

( * ) Notice: Subject to any disclaimer, the term of this patent is extended or adjusted under 35 U.S.C. 154(b) by 351 days.

This patent is subject to a terminal disclaimer.

(21) Appl. No.: 16/624,379

(22) PCT Filed: Jun. 21, 2018

(86) PCT No.: PCT/EP2018/066582
§ 371 (c)(1),
(2) Date: Dec. 19, 2019

(87) PCT Pub. No.: WO2019/002088
PCT Pub. Date: Jan. 3, 2019

(65) Prior Publication Data
US 2020/0120963 A1    Apr. 23, 2020

(30) Foreign Application Priority Data

Jun. 29, 2017  (EP) .................................... 17178730

(51) Int. Cl.
| | |
|---|---|
| A23L 23/10 | (2016.01) |
| A23L 27/00 | (2016.01) |
| A23P 10/28 | (2016.01) |
| A23P 10/35 | (2016.01) |
| C11B 15/00 | (2006.01) |
| A23D 9/00 | (2006.01) |

(52) U.S. Cl.
CPC ............... *A23L 23/10* (2016.08); *A23L 27/72* (2016.08); *A23P 10/28* (2016.08); *A23P 10/35* (2016.08); *A23V 2002/00* (2013.01)

(58) Field of Classification Search
None
See application file for complete search history.

(56) References Cited

U.S. PATENT DOCUMENTS

2007/0134397 A1* 6/2007 Eppler .................... A23P 10/28
426/589
2019/0254321 A1    8/2019 Bulling et al.

FOREIGN PATENT DOCUMENTS

| WO | 2009074442 | 6/2009 |
| WO | 2017097499 | 6/2017 |

OTHER PUBLICATIONS

Gupta: Bouillon cube process design by applying product driven process synthesis; Chemical Engineering and Processing 50 (2011) 9-15. (Year: 2011).*
Yasushi: Microcapsule and Oral Compositions Containing the Same; CA 2470351 C; published Aug. 16, 2011 (Year: 2011).*
Kehlenbeck: A bouillon and/or Seasoning tablet containing cereal, vegetable and/or frit fibers; WO2007085609 A1; published Aug. 2, 2007. (Year: 2007).*
Koriyama: A fat and oil powder and food using the same; JPH07278586 A; published Oct. 24, 1995. (Year: 1995).*

* cited by examiner

*Primary Examiner* — Patricia A George
(74) *Attorney, Agent, or Firm* — K&L Gates LLP

(57) ABSTRACT

The invention relates to a manufacturing process for the production of a bouillon tablet or bouillon cube. In particularly the invention relates to a process for the production of a bouillon tablet or bouillon cube wherein the hygroscopic amorphous ingredients are encapsulated with fat and wherein the encapsulated hygroscopic amorphous ingredients have a fat content of between 22 to 80%.

12 Claims, No Drawings

PROCESS FOR MAKING A BOUILLON TABLET OR BOUILLON CUBE

CROSS REFERENCE TO RELATED APPLICATIONS

The present application is a National Stage of International Application No. PCT/EP2018/066582, filed on Jun. 21, 2018, which claims priority to European Patent Application No. 17178730.2, filed on Jun. 29, 2017, the entire contents of which are being incorporated herein by reference.

TECHNICAL FIELD

The invention relates to a manufacturing process for the production of a bouillon tablet or bouillon cube. In particularly the invention relates to a process for the production of a bouillon tablet or bouillon cube wherein at least 5wt % of hygroscopic amorphous ingredients are encapsulated with fat and wherein the encapsulated hygroscopic amorphous ingredients have a fat content of between 22 to 80%.

BACKGROUND

A bouillon tablet or bouillon cube is widely used as a concentrate to prepare a bouillon, a broth or a soup. The bouillon tablet or bouillon cube is normally added to a hot aqueous solution, allowing it to dissolve. In addition, a bouillon tablet may be used when preparing other dishes, as a seasoning product. The dissolution time of bouillon tablets or bouillon cubes highly depends on its degree of compaction which can be measured/expressed by the hardness of such a product. The reason to compact powders in a regular form presents several advantages for the commercialisation (e.g. reduction of volume, optimisation of packaging material usage, shelf life and convenience). A habit developed by users of hard bouillon is the crumbling of the tablet or cube into the dish during preparation process either to ensure good distribution and or to accelerate its dissolution time in the cooking water. This crumbliness is one of the attributes that needs to be ensured during shelf life and therefore a post-hardening of the tablet or cube has to be avoided. A minimum hardness is necessary to allow a wrapping of the tablet. A maximum hardness ensures that a normal user can break the tablet within fingers without the use of additional tools or appliances. A direct relationship between the free flowing powders that have no binding properties and the ones having binding properties is established and the overall texture is defined by the degree of these interactions and the environmental conditions that find place during process, storage, distribution and usage. A typical bouillon tablet or bouillon cube comprises salts, taste enhancing compounds like monosodium glutamate (MSG), sugars, starch or flour, fat, flavouring components, vegetables, meat extracts, spices, colorants etc. The amounts of the respective compounds may vary depending on the specific purpose of the product, the market or taste of the consumer that is aimed at. A conventional way of manufacturing bouillon tablets or bouillon cubes comprises mixing powdered bouillon components with fat and controlled amounts of oil, and pressing the mix into tablet form.

Consumers are increasingly becoming sensitive to MSG concerns. Many of them justify MSG as not healthy (Chinese restaurant syndrom) and therefore it should be replaced with more natural ingredients, like yeast extract, bacterial extracts, hydrolyzed plant proteins, vegetable extracts and vegetable powders. These amorphous powders possess a high hygroscopicity, which result in undesired post-hardening of the tablet or cube during shelf-life. The term hygroscopicity describes how readily a certain material will take up moisture if exposed to changing relative humidity. In industry, the term hygroscopicity is commonly used for materials that become problematic if relative humidity increases. For example, food powders that show stickiness and caking, caused by humidity conditions, are called hygroscopic.

The behavior of an amorphous substance upon increasing water content (or temperature rise) can be shown by its state diagram. A typical state diagram illustrates a materials glass transition temperature (Tg) against its water content or water activity. An amorphous material passes from a rigid-glassy to a sticky state, once its glass transition temperature is exceeded. The basic state diagram therefore provides an indication of the stability of the glassy state. The sticky state is problematic during processing/manufacturing and causes in pressed cubes bridge-formation followed by post-hardening phenomena especially after going below Tg again.

Hence there is an existing need in the art and food industry to provide a better solution for a manufacturing process for the production of a bouillon tablet or bouillon cube using hygroscopic amorphous ingredients or at least provides an alternative solution.

SUMMARY OF THE INVENTION

The object of the present invention is to improve the state of the art or at least provide an alternative for a manufacturing process for the production of a bouillon tablet or bouillon cube:
  i) The bouillon tablet or bouillon cube has a good crumbliness;
  ii) Minimum hardness of 80 N to allow a wrapping of the tablet;
  iii) Reach a shelf life over 12 month with the same sensory properties and to avoid or at least have a low post-hardening of the tablet over shelf life.
  iv) Enables the user to break the tablet in crumbles to accelerate dissolution The object of the present invention is achieved by the subject matter of the independent claims. The dependent claims further develop the idea of the present invention.

Accordingly, the present invention provides in a first aspect a process for preparing a bouillon tablet or bouillon cube comprising 5 to 35% of hygroscopic amorphous ingredients (by weight of the composition), 30 to 80% of crystalline ingredients (by weight of the composition), 0.5 to 40% of non-hygroscopic amorphous ingredients (by weight of the composition) and 5 to 20% of fat (by weight of the composition)
  a) Mixing all ingredients;
  b) Optionally storage of the mixture;
  c) Pressing a bouillon tablet or bouillon cube;
  d) Packaging the bouillon tablet or bouillon cube;
characterized in that the hygroscopic amorphous ingredients are encapsulated with fat or at least part of the fat and wherein the encapsulated hygroscopic amorphous ingredients have a fat content of between 22 to 80%.

A second aspect of the invention relates to a method for reducing post-hardening of a bouillon tablet or bouillon cube comprising that at least 5% of hygroscopic amorphous ingredients (by weight of the composition) are encapsulated with fat and wherein the encapsulated hygroscopic amorphous ingredients have a fat content of between 22 to 80%.

It has been surprisingly found by the inventors that by using fat encapsulated hygroscopic amorphous ingredients, wherein at least 5% of hygroscopic amorphous ingredients (by weight of the composition) are encapsulated with fat and wherein the encapsulated hygroscopic amorphous ingredients have a fat content of between 22 to 80% achieve the necessary process and consumer expectations:

the bouillon tablet or bouillon cube has a good hardness for wrapping;

the tablet is easily crumbled as for consumer preference;

the tablet is shelf stable over 12 month and has a lower post-hardening compared to non-encapsulated hygroscopic amorphous ingredients;

the encapsulated hygroscopic amorphous ingredients with fat or part of the fat have good machinability.

DETAILED DESCRIPTION

The present invention pertains to a bouillon tablet or bouillon cube comprising 5 to 35% of hygroscopic amorphous ingredients (by weight of the composition), 30 to 80% of crystalline ingredients (by weight of the composition), 0.5 to 40% of non-hygroscopic amorphous ingredients (by weight of the composition) and 5 to 20% of fat (by weight of the composition)

a) Mixing all ingredients;
b) Optionally storage of the mixture;
c) Pressing a bouillon tablet or bouillon cube;
d) Packaging the bouillon tablet or bouillon cube; characterized in that the hygroscopic amorphous ingredients are encapsulated with fat or at least part of the fat and wherein the encapsulated hygroscopic amorphous ingredients have a fat content of between 22 to 80%.

"Bouillon tablet or bouillon cube" means "tablet or cube obtained by pressing a free flowing bouillon powder into a tablet or cube form"

"Crystalline ingredients" according to this invention means at least one ingredient of salt, monosodium glutamate, sugar or citric acid anhydrous, preferably salt or sugar. The bouillon tablet or bouillon cube comprises 30 to 80% (by weight of the composition) crystalline ingredients of at least one of salt, monosodium glutamate, sugar or citric acid anhydrous, preferably 35 to 75%, preferably 35 to 70%, preferably 40 to 65%, preferably 45 to 65%, more preferably 50 to 65% (by weight of the composition) crystalline ingredients of at least one of salt, monosodium glutamate or sugar, preferably salt or sugar. Salt is preferably sodium chloride, but can also comprise other edible salts capable of imparting or enhancing a salty taste perception, such as potassium chloride. In a further embodiment, the composition comprises salt in an amount in the range of 20 to 58% (by weight of the composition), preferably between 30 to 55%, preferably between 35 to 50%, preferably between 40 to 50% (by weight of the composition). In a further embodiment, the composition comprises monosodium glutamate in an amount in the range of 0 to 25% (by weight of the composition), preferably between 0 to 20%, preferably between 0 to 15%, preferably between 0.5 to 25%, preferably between 0.5 to 15%, preferably between 5 to 10% (by weight of the composition). In a further embodiment, the composition comprises sugar in an amount in the range of 0 to 20% (by weight of the composition), preferably between 0 to 15%, preferably between 0.5 to 15%, preferably between 2 to 10% (by weight of the composition). In a further embodiment, the composition comprises citric acid anhydrous in an amount in the range of 0 to 5% (by weight of the composition), preferably between 0.1 to 3%, preferably between 0.1 to 2% (by weight of the composition).

The term "hygroscopic amorphous ingredients" according to this invention means ingredients that have a Tg in the range of $-5°$ C.$<$Tg$<60°$ C. at $0.1<$aw$<0.6$, preferable a Tg in the range of $10°$ C.$<$Tg$<45°$ C. at $0.2<$aw$<0.5$, preferable a Tg in the range of $10°$ C.$<$Tg$<40°$ C. at $0.2<$aw$<0.5$, more preferably a Tg in the range of $10°$ C.$<$Tg$<40°$ C. at $0.2<$aw$<0.4$. The bouillon tablet or bouillon cube comprises 5 to 35% (by weight of the composition) of hygroscopic amorphous ingredients according to this invention means at least one ingredient of yeast extract, vegetable powder, animal extract, bacterial extract, vegetable extract, meat powder, reaction flavor or hydrolysed plant protein or a combination thereof, preferably 7 to 35%, preferably 8 to 35%, preferably 9 to 35%, preferably 10 to 30%, preferably 10 to 25%, preferably 10 to 20%, preferably 5 to 25%, preferably 5 to 15% (by weight of the composition). Preferably hygroscopic amorphous ingredients according to this invention means at least one ingredient of yeast extract, chicken extract, onion powder, garlic powder, celery root powder, tomato powder, bacterial extract, reaction flavor or a combination thereof. A bacterial extract is described within WO2009040150 or WO2010105842. A vegetable extract is described within WO2013092296. Vegetable powder means at least one ingredient of onion powder, garlic powder, tomato powder, celery root powder or a combination thereof. In a further embodiment, the composition comprises yeast extract in an amount in the range of 0 to 15% (by weight of the composition), preferably between 1 to 15%, preferably between 1 to 10%, preferably between 1 to 7%, preferably between 2 to 6% (by weight of the composition). In a further embodiment, the composition comprises vegetable powder in an amount in the range of 0 to 15% (by weight of the composition), preferably between 0.1 to 15%, preferably between 0.1 to 10%, preferably between 1 to 10%, preferably between 1 to 7% (by weight of the composition). In a further embodiment, the composition comprises animal extract in an amount in the range of 0 to 15% (by weight of the composition), preferably between 0.1 to 15%, preferably between 0.1 to 10%, preferably between 0.1 to 5% (by weight of the composition). In a further embodiment, the composition comprises bacterial extract in an amount in the range of 0 to 15% (by weight of the composition), preferably between 0.1 to 15%, preferably between 0.1 to 10%, preferably between 1 to 10%, preferably between 2 to 8% (by weight of the composition). In a further embodiment, the composition comprises vegetable extract in an amount in the range of 0 to 15% (by weight of the composition), preferably between 0.1 to 15%, preferably between 0.1 to 10%, preferably between 0.1 to 5% (by weight of the composition). In a further embodiment, the composition comprises meat powder in an amount in the range of 0 to 15% (by weight of the composition), preferably between 0.1 to 15%, preferably between 0.1 to 10%, preferably between 0.1 to 5% (by weight of the composition). In a further embodiment, the composition comprises reaction flavor in an amount in the range of 0 to 15% (by weight of the composition), preferably between 0.1 to 15%, preferably between 0.1 to 10%, preferably between 0.1 to 5% (by weight of the composition). In a further embodiment, the composition comprises hydrolysed plant protein in an amount in the range of 0 to 15% (by weight of the composition), preferably between 0.1 to 15%, preferably between 0.1 to 10%, preferably between 1 to 10%, preferably between 2 to 8% (by weight of the composition). In a further embodiment, the composition comprises chicken extract in an amount in the range of 0 to 5%

(by weight of the composition), preferably between 0.5 to 5%, preferably between 1 to 3% (by weight of the composition). In a further embodiment, the composition comprises onion powder in an amount in the range of 0 to 10% (by weight of the composition), preferably between 0.1 to 10%, preferably between 0.1 to 5%, preferably between 1 to 5% (by weight of the composition). In a further embodiment, the composition comprises celery root powder in an amount in the range of 0 to 10% (by weight of the composition), preferably between 0.1 to 10%, preferably between 0.1 to 5%, preferably between 1 to 5% (by weight of the composition). In a further embodiment, the composition comprises tomato powder in an amount in the range of 0 to 10% (by weight of the composition), preferably between 0.1 to 10%, preferably between 0.1 to 5%, preferably between 1 to 5% (by weight of the composition).

The term "non-hygroscopic amorphous ingredients" according to this invention have a Tg of at least 60° C. at $0.1<aw<0.6$, preferably a Tg between 60 to 250° C. at $0.1<aw<0.6$. In case the hygroscopic amorphous ingredient have a Tg in the range of 10° C. $<Tg<45°$ C. at $0.2<aw<0.5$ the non-hygroscopic amorphous ingredients have a Tg in the range of at least 45° C. at $0.2<aw<0.5$, preferably a Tg in the range of 45 to 250° C. at $0.2<aw<0.5$. In case the hygroscopic amorphous ingredient have a Tg in the range of 10° C.$<Tg<40°$ C. at $0.2<aw<0.5$ the non-hygroscopic amorphous ingredients have a Tg in the range of at least 40° C. at $0.2<aw<0.5$, preferably a Tg in the range of 40 to 250° C. at $0.2<aw<0.5$. In case the hygroscopic amorphous ingredient have a Tg in the range of 10° C. $<Tg<40°$ C. at $0.2<aw<0.4$ the non-hygroscopic amorphous ingredients have a Tg in the range of at least 40° C. at $0.2<aw<0.4$, preferably a Tg in the range of 40 to 250° C. at $0.2<aw<0.4$. Non-hygroscopic amorphous ingredients according to this invention means at least one ingredient of maltodextrin, starches, flours, glucose syrup, fiber or a combination thereof. The bouillon tablet or bouillon cube comprises 0.5 to 40% non-hygroscopic amorphous ingredients (by weight of the composition) composed of at least one of maltodextrin, starches, flours or glycose syrup, preferably 2 to 40%, preferably 5 to 40%, preferably 5 to 35%, preferably 5 to 30%, preferably 5 to 25%, preferably 5 to 20%, preferably 5 to 15% (by weight of the composition). In a further embodiment, the composition comprises starches and/or flours in an amount in the range of 0 to 25% (by weight of the composition), preferably between 1 to 25%, preferably between 1 to 15%, preferably between 5 to 25%, preferably between 5 to 20%, preferably between 5 to 15%, preferably between 5 to 10% (by weight of the composition). In a further embodiment, the composition comprises glucose syrup in an amount in the range of 0 to 15% (by weight of the composition), preferably between 1 to 15%, preferably between 5 to 15% (by weight of the composition). In a further embodiment, the composition comprises maltodextrin in an amount in the range of 0 to 15% (by weight of the composition), preferably between 1 to 15%, preferably between 5 to 15% (by weight of the composition).

"Fat" of the present invention is solid at a room temperature of 25° C., preferably at a room temperature of 20° C. Fat according to this invention means to have at a temperature of 30° C. a solid fat content of 35-75% and a slip melting point in a range of 42-69° C., preferably to have at a temperature of 30° C. a solid fat content of 45-65% and a slip melting point in a range of 44-65° C. Fat according to this invention means a vegetable and/or animal fat. In a further embodiment fat according to this invention means at least one ingredient of palm fat, fractionated fat, fractionated beef fat, fractionated chicken fat, algae fat or shea butter. In a further embodiment, the composition comprises fat in an amount in the range of 5 to 20% (by weight of the composition), preferably between 5 to 17%, preferably between 6 to 13% (by weight of the composition).

The term "encapsulation" according to this invention means the formation of a layer to very small particles (below 300 μm to 1000 μm). Encapsulation aims at the protection and controlled release of active molecules (hygroscopic amorphous ingredients) when immersed in an environment. Encapsulation is not an agglomeration or granulation. The encapsulation shall be done with as much fat as possible/ available in the recipe but should not be lower than a fat content of 20% of the encapsulated hygroscopic amorphous ingredients. In an embodiment of the invention the encapsulated hygroscopic amorphous ingredients have a fat content of between 22 to 80%, preferably between 25 to 80%, preferably between 30 to 80%, preferably between 35 to 80%, preferably between 40 to 80%, preferably between 35 to 70%, preferably between 35 to 60%.

In a further embodiment, the composition comprises garnishes, herbs or spices or a combination thereof in an amount in the range of 0 to 30% (by weight of the composition), preferably between 0.1 to 30%, preferably between 0.1 to 25%, preferably between 0.1 to 20%, preferably between 0.1 to 15%, preferably between 0.1 to 10%, preferably between 1 to 10%, preferably between 0.1 to 5%, preferably between 1 to 5% (by weight of the composition). The term "garnishes, herbs, or spices or a combination thereof" in the context of the composition means pieces of parsley, celery, fenugreek, lovage, rosemary, marjoram, dill, tarragon, coriander, ginger, lemongrass, curcuma, chili, ginger, paprika, mustard, garlic, onion, turmeric, tomato, coconut milk, cheese, oregano, thyme, basil, chillies, paprika, pimento, jalapeno pepper, white pepper powder and black pepper.

In a further embodiment, the composition comprises oil in an amount in the range of 0 to 5% (by weight of the composition), preferably between 0.5 to 5% (by weight of the composition), preferably between 0.5 to 3% (by weight of the composition). In a preferred embodiment, the oil is a vegetable oil. Preferably, the oil is selected from the group consisting of sunflower oil, rape seed oil, cotton seed oil, peanut oil, soya oil, olive oil, coconut oil, or a combination thereof; more preferably sunflower oil. Oil of the present seasoning product is liquid at a room temperature of 25° C., preferably at a room temperature of 20° C.

In an embodiment, the bouillon tablet or bouillon cube has a tablet hardness of at least 80 N, preferably at least 90 N, preferably at least 100 N, preferably at least 110 N, preferably at least 120 N, preferably between 80 to 400 N, preferably between 80 to 350 N, preferably between 80 to 300 N, preferably between 90 to 400 N, preferably between 90 to 350 N, preferably between 90 to 300 N.

Post-hardening is the increase in hardness of tablets/cubes due to changes of water activity and/or temperature, especially caused by a decrease in water activity and/or temperature which leads the hygroscopic amorphous materials to undergo glass transition temperature from the "sticky" to the "glassy" state. Bouillon tablets or bouillon cubes of the invention had a significantly reduced post-hardening effect when for example being tested and exposed to cycles of humidity conditions, simulating frequently experienced environmental conditions products are exposed to in real market and private storage conditions. The results of those tests are provided in the Experimental section below.

In an embodiment the bouillon tablet or bouillon cube is shelf-stable over 12 months and therefore has a water activity of below 0.5, preferably between 0.1 to 0.5.

EXAMPLES

The invention is further described with reference to the following examples. It is to be appreciated that the examples do not in any way limit the invention.

Description of Methods

The process of sample preparation can be subdivided in the three basic processing steps; encapsulating of hygroscopic amorphous ingredients, mixing of bouillon masses and pressing of bouillon tablets.
Prior processing, it has to be decided, which materials will be encapsulated.

Selection of Core Materials

Which materials of a bouillon recipes will be encapsulated is decided based on their hygroscopicity. Ingredients are classified as hygroscopic, if they possess a Tg in the range of $-5°$ C.$<$Tg$<60°$ C. at aw$0.1<$aw$<0.6$.
Furthermore, the amount of available fat in the recipe and the total quantity of hygroscopic amorphous ingredients determine kind and quantity of ingredients that can be encapsulated. If the total fat content is too low to encapsulate all materials, classified as above, materials in the Tg range of $10°$ C.$<$Tg$<45°$ C. at aw$0.2<$aw$<0.5$ are preferably chosen as core material over those with higher Tg. If not all ingredients with this classification can be encapsulated, ingredients with Tg $10°$ C.$<$Tg$<40°$ C. at aw $0.2<$aw$<0.4$ are preferably chosen.

Preparation of Fat Encapsulated Ingredients

Encapsulating has to be performed in a way that hygroscopic amorphous ingredients are preferably fully and homogeneously covered with fat
A homogeneous encapsulation can e.g. be produced via core-shell technologies like fluidized bed encapsulation technology or to produce fat flakes with incorporation of hygroscopic ingredients

Fluidized Bed Encapsulation

A batch fluidized bed encapsulator (GPCG 15, Glatt GmbH, Germany) was used to encapsulate hygroscopic amorphous substances. The experiments were carried out using the top-spray method. The process needs to be executed in a way that a fine, flow-able powder is generated. Hygroscopic amorphous ingredients act as core materials and are homogenously encapsulated with the fat.
Prior to the actual encasulation process, the desired amount of selected hygroscopic amorphous ingredients was filled in the bottom part of the encapsulation-chamber. Encapsulation was performed by fluidizing this material at the lower part of the chamber and spraying the melted fat from the top on the particles (top-spray method). Droplet formation, contact, spreading, coalescence and solidification are proceeding almost simultaneously.
All operating parameters have to be chosen in a way that fat homogeneously spreads around the fluidized particles and forms a thin layer on the surface of each fluidized particle.

The droplet size, received during spraying of encapsulating material, is crucial for the encapsulating quality. The molten fat needs to be atomized into small droplets. Larger droplets might lead to undesired agglomeration phenomena. It should be emphasized that it is desired to encapsulate every particle and thus to separate the particles. At the same time, it has to be avoided that particles stick together.
Fat was heated (70° C.) outside the encapsulation-chamber on a heating plate and pumped via heat-able tubes (70° C.) to the nozzle. The flow rate of the encapsulated material can be controlled by a pump and was set to 78-128 g/min.
The nozzle was heated by spraying air to a temperature between 50-75° C. in order to inhibit premature crystallisation of fat. The spraying air was also used to preheat the encapsulation-chamber. Prior to the actual encapsulation-experiments, the hot air (50-75° C.) was circulating for 30 min in the chamber. The pressure of the spraying air influences the spraying pattern and the droplet size. A pressure of 1.5-2 bar was chosen in order to generate small droplets of fat, which spread over the fluidized particles and form a homogeneous encapsulation layer. It is thereby of importance that the produced droplets (less than 100 μm) are smaller than the fluidized particles. The fluidized bed was built up by the fluidizing air stream, which flows through an inlet pipe at the bottom of the chamber. Before entering the system, the fluidizing air was preheated to a desired temperature (30° C.). The product temperature measured during spraying varied between 17-25° C.
The volumetric flow of the fluidizing air is an important parameter, as it is used to control the height of the fluidized bed. The core material should be fluidized in a way that the tip of the nozzle is immersed in the fluidized bed. Furthermore, the volumetric flow of the fluidizing air should be high enough to prevent that particles stick together.
In order to implement this during the whole process, the volumetric flow was adjusted while the fluidized bed encapsulator was running. A low volumetric flow (350 m$^3$/h) was applied in the beginning of the process. Throughout the process the volumetric flow of the fluidizing air had to be adapted. This is due to the increasing weight of the fluidized bed, caused by the addition of fat. The volumetric flow had to be increased (up to 800 m$^3$/h) during the process in order to maintain an appropriate fluidization of the powder.
Once the complete amount of palm fat was atomized, a cooling step was executed. During this, the product was continuously fluidized for 10 min. At the same time, the fluidizing air temperature was reduced to 10° C., resulting in a final average product temperature of 12° C.

Fat Flake Production

In a first step, hygroscopic amorphous ingredients were dispersed in molten fat (65° C.) in a bionaz tank (N° B 20 0000) with double jacket (Bionaz, France). This tank is equipped with a stirring device and a dispersion disc. The operating parameters were chosen in a way that a homogeneous dispersion of the particles in the fat was achieved.
In a second step, fat flakes were produced with a cooling drum (K6, 5/6) (Sulzer-Escher Wyss AG, Switzerland). The produced dispersion was pumped in a feed basin and distributed with an applicator roll as a thin layer on the rotating cooling drum (Rotation: 10.3 rpm; Temperature: Cold side: −15 to −14.5° C.; Warm side: −11.2 to −9.3° C.). A scraper (clearance: 0.25 mm) removes the material from the drum and forms fat flakes.

Preparation of Bouillon Powder

The preparation of the model recipes was performed with a Lödige ploughshare batch mixer (FM 130 D) (Gebrüder Lödige Maschinenbau GmbH, Germany). This mixer is composed of a horizontal, cylindrical drum with rotating ploughshare shovels. The ploughshare shovels are used as mixing elements and are organized systematically in the drum. The mixer is equipped with a chopper.

Mixing was performed in four steps. During the first step crystalline ingredients were mixed for 30 s at 200 rpm (without chopper). In the second step fat powder was added and mixed at 200 rpm for 60 s. During this mixing step, sunflower oil was sprayed in the mixer. To avoid the formation of lumps, the chopper was used during this mixing step. In case the complete amount of fat in a recipe was incorporated via encapsulated material, only sunflower oil and crystalline ingredients were mixed in this step. In the third step, all remaining materials, except garnishes, were added and mixed for 60 s at 200 rpm. The chopper was turned on for 15 s. During the last mixing step, garnishes were added and mixing was performed at 200 rpm for 30 s (without chopper).

It is also possible to use a different mixing procedure. For example, melted fat can be used instead of powdered fat. When fat is introduced in melted form, fat is completely melted at 80° C. (clear and transparent in appearance) and sprayed in the mixer during the first mixing step. Mixing time can then be increased.

One batch mixing was carried out for 50 kg bouillon powder. The resulting powder was then stored in closed plastic bags for at least 24 h at room temperature prior to pressing.

Pressing of Bouillon Cube

Pressing of bouillon cube was carried out with Flexitab Tablet Pressing equipment (Röltgen GmbH, Germany). Bouillon powder was automatically fed to a tableting mold. Filling depth was adjusted in a way to receive cubes with an average weight of 4 g and height of 14 mm.

Hardness Measurement of Bouillon Tablet

Hardness measurement was carried out using Texture Analyser TA-HDplus (Stable Micro System, UK) equipped with 250 kg load cell and P/75 compression platen. Texture Analyser test mode was set to "Compression" with pre-test speed of 1 mm/s, test speed of 0.5 mm/s, post-test speed of 10 mm/s, target mode of "Distance", distance of 5 mm, halt time was set to "No", way back of 10 mm, trigger type to "Auto(Force), and trigger force of 50 gram. Bouillon tablet was placed centrally in vertical-landscape orientation. Hardness measurement was carried out in 10 replication.

Evaluation of Post-Hardening of Bouillon Tablets

For each sample, hardness was measured directly after pressing, with the described method. Additionally, prior to hardness measurement, cubes of each sample were stored unpacked at specified conditions to evoke post hardening phenomena. A memmert ICH 100 L climate chamber (Memmert GmbH+Co. KG, Germany) was used for storage of samples.

In order to provoke and evaluate post hardening, cubes were stored at varying relative humidity. In a first step, cubes should absorb moisture and were thus stored at higher relative humidity. During a second storage step, relative humidity was reduced in order to cause drying of cubes. Two different storage conditions have been used to investigate post hardening of cubes (see table 1).

TABLE 1

| Storage conditions applied for investigation of post hardening. | | | | |
|---|---|---|---|---|
| Condition | Step | Relative humidity [%] | Temperature [° C.] | Time [d] |
| A | 1 | 55 | 25 | 3 |
|   | 2 | 15 | 25 | 3 |
| B | 1 | 60 | 25 | 4 |
|   | 2 | 30 | 25 | 3 |

Post hardening of samples, containing encapsulated hygroscopic amorphous ingredients was compared with hardness of samples containing pure hygroscopic amorphous ingredients (reference). Therefore the hardness of the hard bouillon cube has been measured as described above.

Examples 1-3

Hygroscopic amorphous ingredients in the recipe were identified based on their Tg-curves including celery root powder, onion powder, chicken extract, bacterial extract and yeast extract (11.9% of the recipe). Encapsulation of the hygroscopic amorphous ingredients was done with the available palm fat of the recipe (9.9%). No additional palm fat was used compared to the example with non-encapsulated hygroscopic amorphous ingredients. An encapsulation-ratio of 40% fat and 60% hygroscopic amorphous ingredients was applied. Thus a total quantity of 19.83% encapsulated material was used in the sample, whereas the reference contains the pure hygroscopic amorphous ingredients. In addition only 3% of the hygroscopic amorphous ingredients has been encapsulated and an encapsulation-ratio of 40% fat and 60% hygroscopic amorphous ingredients was applied. Thus a total quantity of 5% encapsulated material was used in the sample.

| Ingredients | Comp. example 1 | Example 2 | Comp. example 3 |
|---|---|---|---|
| NaCl | 55 | 55 | 55 |
| Sugar | 7 | 7 | 7 |
| Palmfat Powder | 9.9 | 1.97 | 7.9 |
| Chicken fat | 2.4 | 2.4 | 2.4 |
| Starch Corn Native 6% | 5.5 | 5.5 | 5.5 |
| Hygroscopic amorphous ingredients (not encapsulated) | 11.9 | — | 8.9 |
| Garnishes, herbs and spices | 8.3 | 8.3 | 8.3 |
| Hygroscopic amorphous ingredients (encapsulated) | — | 19.83 | 5 |
| Average hardness after pressing [N] | 99 | 90 | 94 |
| Average post hardening [N] Storage: 1. Step: 55% r.h., 25° C., 3d 2. Step: 15% r.h., 25° C., 3d | 782 | 158 | 761 |

The encapsulation of hygroscopic amorphous ingredients (example 2) causes less post-hardening of the bouillon cube as observed in comparison example 1. The bouillon cube of example 2 has still a very good crumbliness wherein the bouillon cube from comparison example 1 is too hard to be crumbled by a consumer. In addition as can be shown with comparison example 3 that encapsulation of only 3% of hygroscopic amorphous ingredients (by weight of the composition) does not result in a reduced post-hardening effect.

Examples 4-5

Hygroscopic amorphous ingredients in the recipe were identified based on their Tg-curves including celery root powder, onion powder, bacterial extract and hydrolyzed plant protein (11.9% of the recipe). Encapsulation of the hygroscopic amorphous ingredients was done with the available palm fat of the recipe (8%). No additional palm fat was used compared to the example with non-encapsulated hygroscopic amorphous ingredients. An encapsulation-ratio of 40% fat and 60% hygroscopic amorphous ingredients was applied. Thus a total quantity of 19.83% encapsulated material was used in the sample, whereas the reference contains the pure hygroscopic amorphous ingredients.

| Ingredients | Comp. Example 4 | Example 5 |
|---|---|---|
| Salt NaCl | 57 | 57 |
| Sugar | 9.5 | 9.5 |
| Palmfat Powder | 8.0 | 0.07 |
| Oil Sunflower | 0.8 | 0.8 |
| Starch Potato 20% Moisture | 9 | 9 |
| Hygroscopic amorphous ingredients (not encapsulated) | 11.9 | — |
| Garnishes, herbs and spices | 3.8 | 3.8 |
| Hygroscopic amorphous ingredients (encapsulated) | — | 19.83 |
| Average hardness after pressing [N] | 236 | 180 |
| Average post hardening [N] Storage: 1. Step: 55% r.h., 25° C., 3d 2. Step: 15% r.h., 25° C., 3d | 495 | 296 |

The encapsulation of hygroscopic amorphous ingredients (example 5) causes less post-hardening of the bouillon cube as observed in comparison example 4.

Examples 6-10

Hygroscopic amorphous ingredients in the recipe were identified based on their Tg-curves including celery root powder, onion powder, bacterial extract, reaction flavor and hydrolyzed plant protein (12.6% of the recipe). Encapsulation of the hygroscopic amorphous ingredients was done with the available palm fat of the recipe (8%). No additional palm fat was used compared to the example with non-encapsulated hygroscopic amorphous ingredients. Encapsulation was performed via fluidized-bed technology (FB) as well as via incorporation of fat flakes. The total amount of available palm fat (8%) was used to produce fat flakes (39% fat content). The selected sensitive amorphous ingredients were furthermore encapsulated with three different encapsulation-ratios (39%/30%/20%) via fluidized-bed encapsulation.

| Ingredients | Comp. Ex. 6 | Example 7 | Example 8 | Example 9 | Comp. Ex. 10 |
|---|---|---|---|---|---|
| Salt NaCl | 55 | 55 | 55 | 55 | 55 |
| Sugar | 8 | 8 | 8 | 8 | 8 |
| Palmfat Powder | 8 | — | — | 2.6 | 4.85 |
| Oil Sunflower | 0.8 | 0.8 | 0.8 | 0.8 | 0.8 |
| Starch Potato 20% Moisture | 8.5 | 8.5 | 8.5 | 8.5 | 8.5 |
| Hygroscopic amorphous ingredients (not encapsulated) | 12.6 | — | — | — | — |
| Garnishes, herbs and spices | 7.1 | 7.1 | 7.1 | 7.1 | 7.1 |
| Fat flakes (39% fat content) | — | 20.6 | — | — | — |
| Hygroscopic amorphous ingredients (39% fat content via FB) | — | — | 20.6 | — | — |
| Hygroscopic amorphous ingredients (30% fat content via FB) | — | — | — | 18 | — |
| Hygroscopic amorphous ingredients (20% fat content via FB) | — | — | — | — | 15.75 |
| Average hardness after pressing [N] | 149 | 110 | 112 | 126 | 109 |
| Average post hardening [N] Storage: 1. Step: 60% r.h., 25° C., 4d 2. Step: 30% r.h., 25° C., 3d | 869 | 310 | 280 | 288 | 422 |

Using hygroscopic amorphous ingredients (comp. example 6) which are not encapsulated result in the highest post-hardening effect of the bouillon cube. Example 7 and 8 show that with any of the encapsulation processes a reduced post-hardening of the bouillon cube is achieved compared to the not encapsulated comparison example 6. In addition within comparison example 10 it is shown that a fat content of 20% of the encapsulated hygroscopic amorphous ingredients still reduces the post-hardening effect of the bouillon cube. However, the obtained hardness of the cube exceeded the maximum acceptable limit for crumbliness as evaluated by 10 internal experienced panelists.

The invention claimed is:
1. A process for preparing a bouillon product, comprising:
5 to 40% of fiber (by weight of the composition), characterized by having a rate of hydration between 15 to 500 cP/min;
5 to 20% of fat (by weight of the composition), characterized by having a slip melting point in a range of 42-69° C. and at a temperature of 30° C. a solid fat content of 35-75%;
30 to 80% of crystalline ingredients (by weight of the composition); and
5 to 35% of hygroscopic amorphous ingredients (by weight of the composition);
comprising the steps of:
a) encapsulating fiber with fat to generate a fiber-fat powder; wherein the fiber has a fat content of between 22 to 80% (by weight of the fiber);
b) mixing the fiber-fat powder with the crystalline ingredients and the non-hygroscopic amorphous ingredients to make a bouillon product in the form of: powder, tablet or cube; and
c) packaging the bouillon product.
2. The process according to claim 1, wherein the fiber has a Tg in the range of −5° C.<Tg<60° C. at 0.1<aw<0.6.
3. The process according to claim 1, wherein the hygroscopic amorphous ingredients are selected from the group consisting of yeast extract, vegetable powder, animal extract, bacterial extract, vegetable extract, meat powder, reaction flavor or hydrolysed plant protein and combinations thereof.
4. The process according to claim 1, wherein the fiber has a Tg of at least 60° C. at 0.1<aw<0.6.
5. The process according to claim 1, wherein the fiber comprises: maltodextrin, starch, flour, or combinations thereof.
6. The process according to claim 1, wherein the crystalline ingredient is selected from the group consisting of salt, monosodium glutamate, sugar or citric acid anhydrous and combinations thereof.

7. The process according to claim 1, wherein the encapsulated hygroscopic amorphous ingredients have a fat content of between 30 to 60%.

8. The process according to claim 1, wherein the bouillon product further comprises 0.1 to 30% garnishes, herbs or spices or a combination thereof (by weight of the composition).

9. The process according to claim 1, wherein the encapsulation of the fiber is done by using a core-shell technology.

10. The process according to claim 1, wherein the encapsulation of the fiber is done by using fluidized bed technology.

11. The process according to claim 1, wherein the encapsulated fiber is not in granular form.

12. The process according to claim 1, wherein the encapsulated fiber does not comprise starch.

* * * * *